UNITED STATES PATENT OFFICE.

JACOB S. ROBESON, OF PENNINGTON, NEW JERSEY.

ADHESIVE AND PROCESS OF MAKING SAME.

1,292,068. Specification of Letters Patent. Patented Jan. 21, 1919.

No Drawing. Application filed February 21, 1916. Serial No. 79,759.

*To all whom it may concern:*

Be it known that I, JACOB S. ROBESON, a citizen of the United States, residing at Pennington, in the county of Mercer and State of New Jersey, have invented certain new and useful Improvements in Adhesives and Processes of Making Same, of which the following is a specification.

This invention relates to adhesives and processes of making same; and it comprises as a new composition of matter a substantially pure rosin soap or size combined with the characteristic organic bodies of sulfite waste liquor; and it also comprises as a new method of making adhesives a process wherein a rosin size or soap is mingled with a sulfite waste liquor preparation, either or both being used as a dried preparation or as a concentrated liquid; all as more fully hereinafter set forth and as claimed.

Rosin size is a well known material, used as an adhesive and as a size for paper; and it may be briefly described as a rosin soap carrying suspended or emulsified or dissolved therein an excess of rosin. Its composition of course varies with the maker and the purpose for which it is intended; but in a general way it has this composition. It is made by boiling or heating the rosin with a solution of rather less than the amount of caustic soda or soda ash necessary for exact neutralization. Heating may be carried so far as to give a solid or semi-solid material by evaporation of most of the water; or more water may be used and a composition of liquid nature made. Rosin generally requires about 12 per cent. of caustic soda or 16 per cent. of soda ash for exact neutralization to make rosin soap; and rosin size carries an amount of soda varying from nearly this amount to an amount very much smaller. Ordinarily however not more than about 20 per cent. of rosin is left uncombined.

Rosin soap itself may be used for the present purposes but I find it more advantageous to use rosin size.

Sulfite waste liquor is the watery effluent resulting from digestion of wood with a solution either of bisulfite of lime or of bisulfite of lime and magnesia. In the art, this liquid is concentrated by evaporation in various ways to give thickly liquid or solid products; these preparations being used for adhesive and for other purposes. One common use is for core compounds; as an adhesive for binding sand cores for molding purposes.

I have found that for many purposes, and notably for making sand cores, a mixture of rosin size and sulfite waste liquor products makes an adhesive which is much better than either component singly. The strength of an article made by the use of such a composite binder, such as a core for example, is considerably greater than that given by either rosin size or sulfite waste liquor; such strength being much more than the sum of strengths of the amounts of the two binders which compose the composite binder. As to the reason for this increase in strength on mingling the two materials I do not know; and I content myself with noting the fact of the increment in strength resulting from such mingling.

The composition may be made either by admixing dry rosin soap or size with concentrated liquid sulfite waste liquor; or by admixing dry sulfite liquor preparations with liquid rosin soap or size. Or the two dry preparations may be mixed and water added by the user. Liquid rosin size may of course be mixed with a neutral liquid sulfite waste liquor. The particular way of mixing depends upon the rosin size and sulfite liquor preparations available and upon the thickness desired in the product; that is, the amount of water desired in the final product may be contained in either component, both or neither.

A mixture of one part by volume of thick commercial rosin size containing 10 to 20 per cent. of free rosin with one part by volume of commercial dry powdered sulfite waste liquor makes a desirable adhesive for the present purposes. With 3 parts rosin size and 7 parts dry sulfite liquor, the mixture is rather too thick for core binder purposes; but it may be used where thick adhesives are desired. With commercial thick sulfite liquor of about 30° Baumé, dry rosin size in the amount of 10 to 20 per cent. may be employed to give a composition like that first mentioned.

Instead of rosin size, rosin soap may be used, but the size gives better compositions for the present purposes.

Oils may be readily emulsified with the described composition, giving products desirable for various purposes. These oils may be mineral oils or fatty oils, drying or non-drying. For example, with the first mentioned composition may be emulsified up to 2 parts of cylinder oil, residual oils from petroleum, gas oil, etc. As much as 3 parts of linseed oil may be emulsified to give a permanent composition. A composition of sulfite waste liquor, rosin soap or size and linseed oil is itself a highly desirable adhesive for many purposes.

The sulfite waste liquor preparation used may be made in any desired way, as by neutralizing and evaporation to dryness or to a thick liquor. Liquor evaporated in its natural acid state may be used but is best neutralized before admixture. The thin liquor coming from the paper digester contains a small amount of sugars which add very little to the binding power of the final product; and the thin liquor may therefore be fermented prior to concentration, thereby getting rid of these sugars with production of alcohol, without detriment to its value for the present purposes. Dried liquor made in rotary driers under more or less vacuum is a commercial form of sulfite liquor well adapted for my uses. It may be fine ground; but this is not necessary. The present invention makes grades of dried and powdered sulfite liquor available as core binders; a matter of some difficulty otherwise. The dried powders stir well into thick liquid rosin size or soap; and there is no tendency to separation. In the presence of the rosin size or soap, it is also possible, as noted *ante*, to combine them with oils.

What I claim is:—

1. As a new adhesive, a composition comprising concentrated sulfite waste liquor and a non-alkaline, substantially pure alkali resinate.

2. As a new adhesive, a composition comprising dry concentrated sulfite waste liquor and a non-alkaline resinate solution.

3. As a new adhesive, a composition comprising concentrated sulfite waste liquor and rosin size.

4. As a new adhesive, a composition comprising dry concentrated sulfite waste liquor and rosin size.

5. As a new adhesive, a composition comprising concentrated sulfite waste liquor, rosin size and an emulsified oil.

6. In the manufacture of adhesives the process which comprises combining concentrated sulfite waste liquor and rosin size.

In testimony whereof I affix my signature hereto.

JACOB S. ROBESON.